United States Patent [19]

St. Jean et al.

[11] Patent Number: 4,510,488

[45] Date of Patent: Apr. 9, 1985

[54] PASSIVE INFRARED INTRUSION DETECTOR

[75] Inventors: Herbert N. St. Jean, New Milford; Richard Settanni, Bethel, both of Conn.

[73] Assignee: Cerberus AG, Switzerland

[21] Appl. No.: 347,633

[22] Filed: Feb. 10, 1982

[51] Int. Cl.[3] ............ G01J 1/00

[52] U.S. Cl. ............ 340/567; 250/340; 340/600; 340/693

[58] Field of Search ............ 340/567, 693, 600; 250/340; D10/106

[56] References Cited

U.S. PATENT DOCUMENTS 4,447,726 5/1984 Mudge et al. ............ 340/567

OTHER PUBLICATIONS

Mountain West Alarm, Cat. A76, p. 13, Phoenix, AZ, 1975.

*Primary Examiner*—Glen R. Swann, III
*Attorney, Agent, or Firm*—Brumbaugh, Graves, Donohue & Raymond

[57] ABSTRACT

A passive infrared intrusion detector is configured to resemble an electrical wall outlet. The unit includes a light for visually indicating the direction of its beam of sensitivity, and a lens unit which facilitates directional adjustment of the beam.

19 Claims, 4 Drawing Figures

PASSIVE INFRARED INTRUSION DETECTOR

The present invention relates to infrared intrusion sensors, and in particular relates to an infrared intrusion sensor which is arranged for mounting within a wall and can take the appearance of an electrical wall outlet. Some aspects of the invention are generally applicable to infrared intrusion sensing devices which can have a conventional exterior wall mounting configuration.

An infrared intrusion sensor of the type to which the present invention relates is described in U.S. Pat. No. 4,275,303, which is assigned to the same assignee as the present application. The prior referenced U.S. patent describes an infrared intrusion sensor wherein there is provided a lens for focusing infrared radiation onto an infrared detecting element. The element is located within a detector housing. The unit also includes a light source within the detector housing, which projects visible light through the same lens element in a manner which enables the installing technician to determine the position of the beams of infrared sensitivity at the time the unit is being mounted. The directions of sensitivity can accordingly be adjusted according to the particular layout of the installation configuration, for example, to arrange infrared sensitivity zones adjacent halls or doors.

Applicants are also aware of an infrared detecting unit which is commercially available, and which has the general configuration of an electrical wall outlet. This configuration provides a certain measure of additional security, because the unit does not have the immediate appearance of an infrared security device to the casual observer, particularly in a dimly lit configuration, such as an unoccupied building.

It is an object of the present invention to provide an improved infrared detecting device, which is particularly adapted for mounting within a wall to resemble an electrical wall outlet.

It is a further object of the present invention to provide an improved infrared detecting unit which has convenient beam direction adjustment.

It is a further object of the present invention to provide an infrared detecting unit which has a beam indicating light.

It is a further object of the present invention to provide a compact arrangement for construction of an infrared detecting unit.

SUMMARY OF THE INVENTION

In accordance with the present invention, there is provided an infrared intrusion detector for mounting within a wall and arranged to resemble an electrical wall outlet. The detector includes an enclosure for insertion into an opening in the wall. A cover plate is provided for mounting to the enclosure. The cover plate has first and second apertures formed in it to resemble corresponding apertures in an electrical outlet cover plate. An infrared radiation detector is mounted within the enclosure and there is also provided a light source also mounted within the enclosure. The detector is arranged adjacent the first aperture while the light source is arranged adjacent the second aperture. There is also provided a lens unit, which is mounted between the enclosure and the cover plate. The lens unit includes a first lens for focusing infrared radiation from a region of space passing through the first aperture onto the detector. The lens unit also includes a second lens for focusing light emitted by the light source into a light beam corresponding to the same region of space.

In a preferred embodiment the detector may also include a second light source which is activated when the unit detects the presence of an object. This light source is preferably arranged adjacent the second aperture and the lens unit may be provided with a region for directly passing the light from the second light source. There may also be provided an opaque cover, positioned between the lens and the enclosure adjacent the second aperture and removeable so as to alternately allow viewing of the first and second light source or conceal the operation of these light sources from an observer.

According to another aspect of the invention the lens unit is provided with a notched slot for mounting onto a projecting member of the enclosure in a plurality of discrete positions. Accordingly, by mounting the lens unit at different positions with respect to the enclosure and the detector unit, the area of sensitivity of the detector unit can be changed.

Another aspect of the present invention is an arrangement for the mounting of components within the enclosure. According to the invention, two printed circuit boards are mounted within the enclosure, a first printed circuit board which is mounted to the rear wall and a second printed circuit board which is arranged in slots adjacent the bottom wall of the enclosure. The second printed circuit board contains a connecting means for connecting the detector to an alarm circuit. An aperture on the enclosure may be provided for passing wires from within the wall into the interior of the enclosure and there may be provided a channel on the exterior of the enclosure for accommodating the circuit wires.

For better understanding of the present invention, together with other and further objects, reference is made to the following description, taken in conjunction with the accompanying drawings, and its scope will be pointed out in the appended claims.

DESCRIPTION OF THE INVENTION

Figure 1:
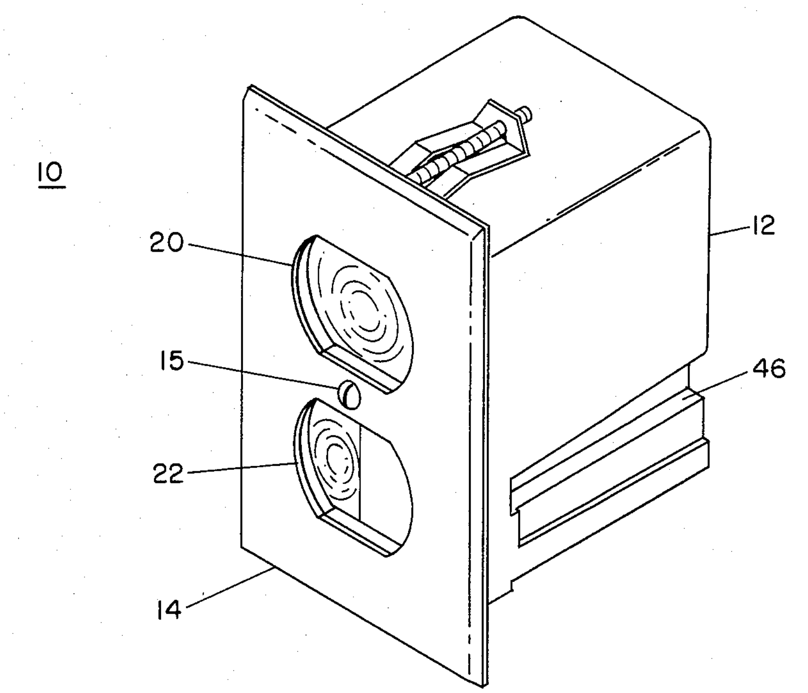
FIG. 1 is a perspective view of an intrusion detector unit in accordance with the present invention.

Referring generally to FIGS. 1 through 4 there is shown a passive infrared intrusion detector in accordance with the present invention. As may be seen with reference to the perspective view of FIG. 1, the intrusion detector is generally arranged to have the outward appearance of electrical wall outlet to the casual observer. Thus, a member of the general public passing through the facility which is protected by the intrusion detector, could not easily observe the existing of the infrared detecting unit and therefore would not immediately know the location of the unit and the area that is protected from intrusion.

The detector 10 includes a plastic enclosure 12 which is approximately the same size as an electrical circuit box and adopted to be inserted into an opening in a wall. When inserted into a wall, the front flange 13 of the enclosure 12 is approximately flush with the surface of the wall and when the cover plate 14 is mounted to the enclosure 12 by a central screw 15 the mounted unit is relatively inconspicuous.

Figure 3:
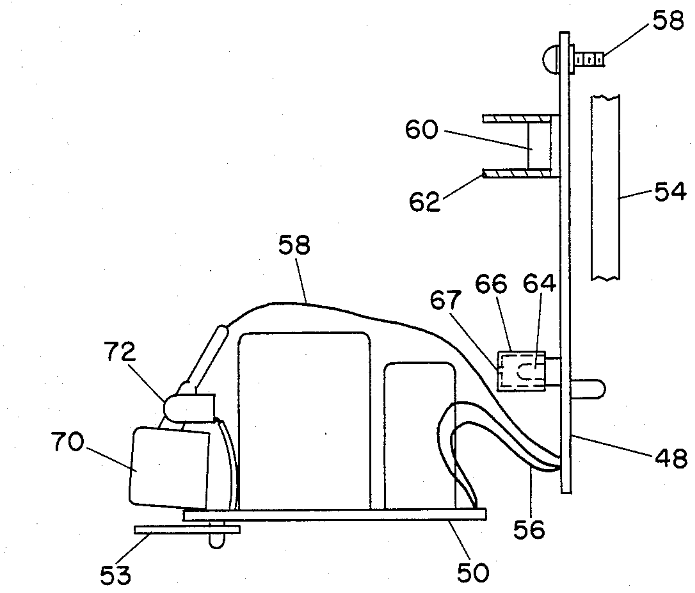
FIG. 3 is a side view of the printed circuit boards used in the intrusion detector of FIG. 1.
Figure 4:
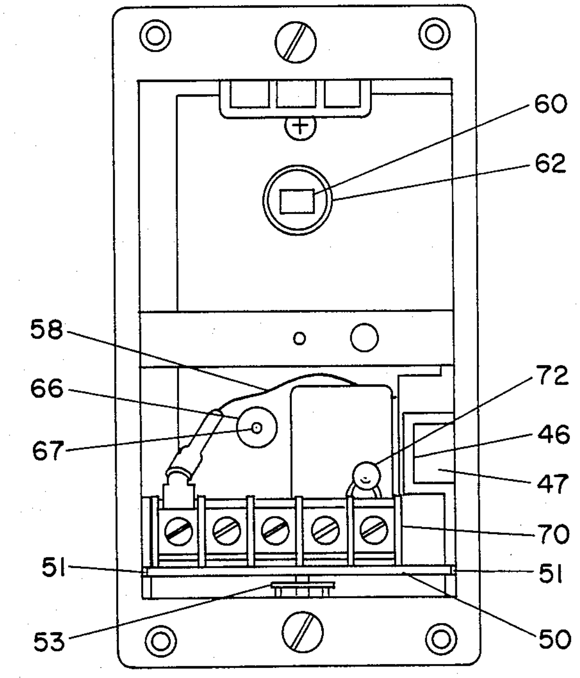
FIG. 4 is a front view of the FIG. 1 intrusion detector with the cover removed.

The principal components of the intrusion detector are located on circuit boards within enclosure 12. As seen in FIG. 3, a first circuit board 48 is mounted to the rear wall of enclosure 12 by a captured screw 58. The circuit board 48 rests upon a foam pad 54, which also serves to provide insulation between the enclosure 12 and the circuit board 48 to prevent undue thermal imbalance of the detector unit 60 which is mounted on circuit board 48. Also mounted on circuit board 48 is a visible light source 64 which is enclosed within a light collimating shield 66 having an aperture 67. As may be seen in FIGS. 3 and 4, the infrared detector 60 mounted on circuit board 48 is provided with a cylindrical shield 62 to shield the sensitive infrared detecting element 60 from cross-drafts which may occur within the enclosure 12 and which might disturb the delicate thermal balance of the unit. Also provided within enclosure 12 is a second printed circuit board 50 connected to the first circuit board 48 by jumper wires 56. Circuit board 50 is received in horizontally extending slots 51 on the interior sidewalls of enclosure 12 and retained therein by a detent arrangement 53. In order to remove circuit boards 48 and 50 from enclosure 12 it is merely necessary to loosen captured screw 58, activate detent 53 to disengage circuit board 50 and then slide circuit board 50 outward so that circuit board 48 is drawn outward by the jumper wires 56. This provides a simple arrangement for mounting of the circuit boards and makes it unnecessary to provide a separate chassis within enclosure 12 for circuit mounting, as is usually the case.

Circuit board 50 includes a terminal block 70 for connecting the detector unit to an alarm circuit, and to a power supply. The terminal block 70 is arranged at the end of circuit board 50 adjacent the opening of enclosure 12 so that the wire connection can easily be effected without removing the circuit board from enclosure 12. If desired, detent 53 can be operated and circuit board 50 slid out by a small amount, provided for by the flexibility of jumper wires 56, without loosening or removing captured screw 58. In order to facilitate the connection of wires, enclosure 12 is provided with an exterior channel 46 along one sidewall with an aperture 47 near the end of channel 46 at a portion of the sidewall which is adjacent the opening of enclosure 12. By providing this channel it becomes possible for wires to be brought into enclosure 12 either from the rear of the enclosure or from the side of the enclosure to a point which is convenient for connection to terminal block 70. Terminal block 70 is also provided with a jumper wire 58 to circuit board 48, which is connected to a power supplying terminal of terminal block 70 and serves as a means for activating light source 64 or disconnecting light source 64 as desired by the user. Typically, it becomes possible when mounting the detector unit in a wall to leave wire 58 connected and thus provide for lighting of light source 64 during alignment of the unit. Following the alignment procedure wire 58 can be disconnected to extinguish light source 64.

Cover plate 14 contains first and second apertures 20 and 22 both of which are used in connection with the operation of the detector unit. Aperture 20 is arranged oppositely adjacent the infrared detector unit 60. Lens unit 16 includes a lens portion 32 which is mounted adjacent to aperture 20 and causes infrared radiation passing through aperture 20 to be focused onto detector unit 60. Thus, changes in infrared radiation within a region of space which is focused by lens 32 onto detector unit 60 will cause activation of the alarm circuit to indicate the presence of the detector. The details of the alarm circuit are conventional and well known to those skilled in the art.

The second aperture 22 is used primarily in connection with alignment and monitoring of the operation of the unit. For purposes of alignment, light source 64 is activated by connection of wire 58, as previously described. The unit is mounted in the wall with opaque cover 26 removed and lens 16 in place. Light from light source 64 is focused by lens portion 34 into a visible light beam which corresponds approximately to the region of space from which infrared radiation will be focused by lens 32 onto detector 60. As may be seen in FIG. 3 light source 64 is provided with a light shield 66 having a small aperture 67 which restricts the extent of the visible light beam to the region of space from which infrared radiation will be sensed by detector 60. As may be seen in FIG. 2, lens unit 34 covers approximately half of aperture 22 and the remaining portion of the lens 16 which is adjacent aperture 22 is a plane light translucent lens portion which enables the viewing of a second light source 72 mounted on printed circuit board 50. Second light source 72 is connected to the intrusion detecting circuit of the device so that when detector 60 senses the presence of an intruder within the region of space from which infrared radiation is focused onto the detector, the activation of the alarm circuit within the detector unit also causes light 72 to be activated. This light source 72 can therefore be used to "walk test" the detector unit during the installation process or thereafter when it is desired to test the unit's operation.

Following installation of the detector unit 10 it may be desirable to prevent the viewing of the alarm indicator light 72, which might cause an intruder to realize that his presence has been detected. Accordingly, an opaque cover 26 may be provided between lens unit 16 and enclosure 12 to prevent the viewing of the alarm indicating light source 72. This opaque cover also prevents viewing of the alarm indicator beam which originates at light source 64. Accordingly, this opaque cover is preferably removed during initial alignment of the device. The opaque cover may also be provided with a knock-out hole 74 to enable viewing of the alarm indicating light to enable frequent walk testing of the device in some installations as desired by the owner of the premises. Accordingly, it is contemplated that opaque cover 26 will be removed during initial installation, alignment, and operational testing of the detector unit, and thereafter will be replaced within the unit.

One feature of the present invention which is particularly useful in connection with installation is the arrangement of lens unit 16 and the manner in which the lens unit 16 is mounted to the enclosure 12. Lens unit 16 is provided with an elongated slot 38 which is arranged asymmetrically with respect to the center of the lens unit. Slot 38 is provided with a plurality of notches 40 which are arranged to engage a cylindrical protrusion 46 on a cross bar 42 of enclosure 12. As illustrated, three such notches are provided so that the lens unit 16 may be mounted in three discrete transverse positions on enclosure 12. Each of these positions corresponds to a different horizontal direction of the region of space from which infrared radiation will be focused onto detector 60, and also corresponds to three discrete orientations of the beam of light from light source 64 into that same region of space. Accordingly, if lens unit 16 is mounted to protrusion 46 by the central one of the three notches, which are generally circular and have diameters about equal to protrusion 46, the region of space from which infrared radiation will be focused onto detector 60 is straight from the detector unit. By moving lens unit 16 into the left or right notches as it is mounted onto projection 46, it is possible to move the region of sensitivity to the right or left angularly from the detector unit. Since the lens unit also includes a lens portion 34 which focuses light from light source 64, there is corresponding movement of the region indicating light beam.

Lens unit 16 is advantageously provided with such discrete notches, since it is practical, as described above to perform an initial installation alignment and testing of the unit with opaque cover 26 removed from the unit to provide for visual viewing of the light beam from source 64 and visual observation of the alarm indicating light 72. After installation is completed, wire 58 can be disconnected to extinguish light 64 and opaque cover 26 can be put into position to block the viewing of indicator light 72. If desired, knock-out hole 74 can be removed to enable viewing of indicator light 72 during operation of the unit. After installation of opaque cover 26, the provision of discrete notches 40 on slot 38 provides an easy method for reinstallation of lens unit 16 in the same position that the lens unit occupied during the alignment procedure.

The lens unit 16 is preferably made of polyethylene plastic and has molded therein lenses formed as fresnel lenses in a relatively flat lens unit. The lenses 32 and 34 are arranged to focus infrared radiation on detector 60 and have a corresponding focal length, and also to focus visible light from light source 64 into a corresponding light beam.

Figure 2:
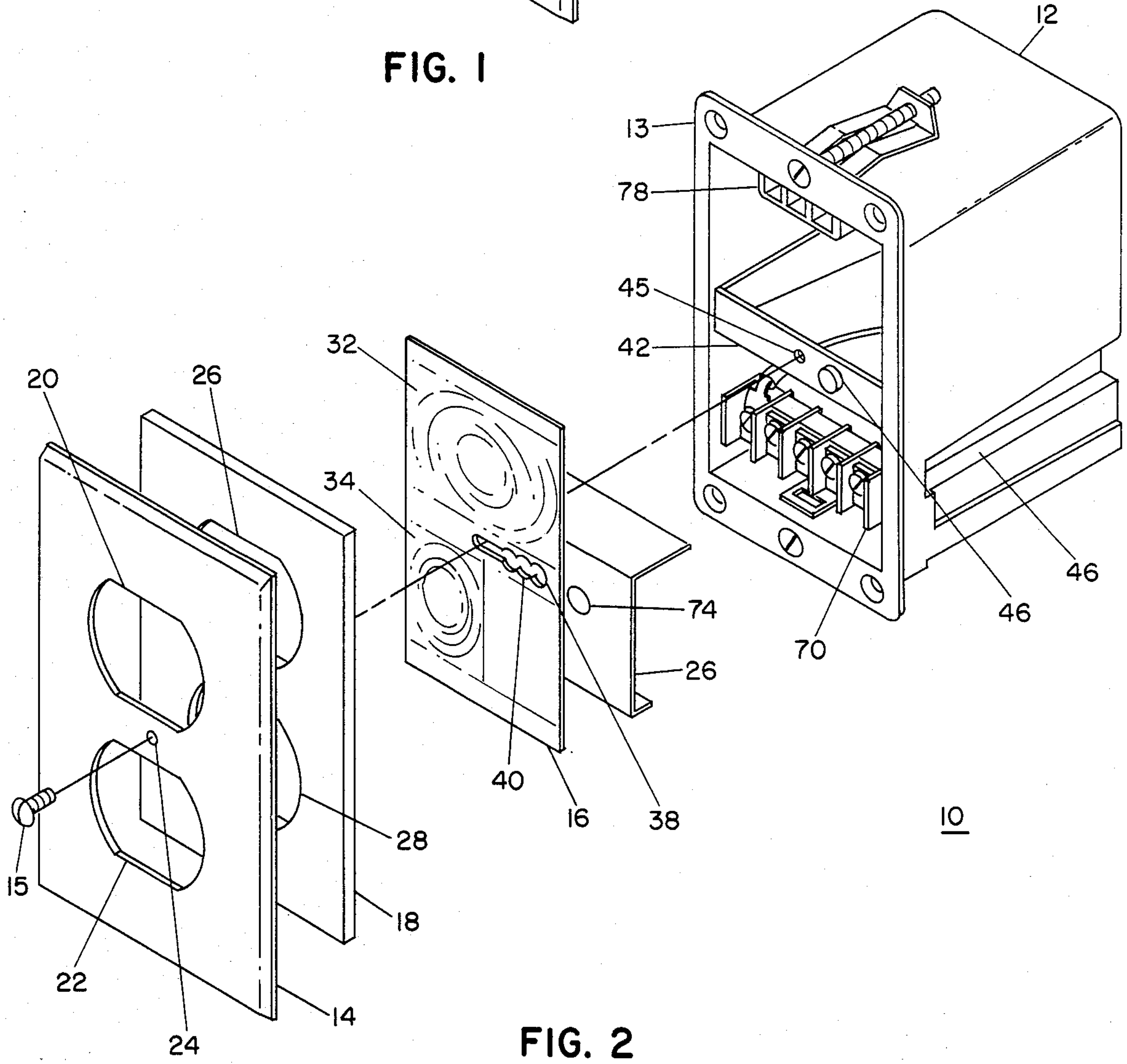
FIG. 2 is an exploded perspective view of the FIG. 1 intrusion detector.

Mechanical details of the detector unit 10 are easily seen in the exploded view of FIG. 2. Opaque cover 26 is provided with upper and lower projections which fit into housing 12 is a manner which maintains the opaque cover in a position to block light viewing through any portion of the lens unit when the cover is in position. Following the installation of opaque cover 26, lens unit 16 is mounted to projection 46. The asymmetrical location of slot 38 and projecting member 46 permit mounting of lens unit 16 in only one orientation i.e., so that the lens unit is not inadvertently installed upside down. On top of lens unit 16 there may be provided a foam cover 18 which has apertures 26 and 28 corresponding to apertures 20 and 22 in cover plate 14. Foam cover 18 also has a central aperture to accommodate mounting screw 15. Likewise, cover plate 14 has a central aperture 24 and screw 15 will passs through this center aperture, the aperture in foam cover 18, a portion of slot 38 in lens 16 and be secured in a tapped hole 44 in cross member 42 on enclosure 12. Foam cover 18 is provided to prevent the entrance of drafts into the enclosure 12. Lens unit 16 in its mounted position rests against a retaining member 78 at the upper portion of enclosure 12 and against the circuit board 50 or mechanical portions thereof.

While there have been described what is believed to be the preferred embodiment of the present invention, those skilled in the art will recognize that other and further modifications may be had thereto without departing from the spirit of the invention, and it is intended to claim all such changes as fall within the true scope of the invention.

We claim:

1. An infrared intrusion detector, for mounting within a wall, and arranged to resemble an electrical outlet, comprising:
   - an enclosure for insertion into an opening in said wall;
   - a cover plate for mounting to said enclosure, said cover plate having first and second apertures formed therein, said apertures resembling corresponding apertures in an electrical outlet cover plate;
   - an infrared radiation detector, mounted in said enclosure adjacent said first aperture;
   - a first light source, mounted within said enclosure adjacent said second aperture; and
   - a lens unit, for mounting between said enclosure and said cover plate, said lens unit including a first lens, for focusing infrared radiation from a region of space and passing through said first aperture onto said detector and a second lens, for focusing light emitted by said light source into a light beam corresponding to said region of space.

2. An intrusion detector as specified in claim 1 wherein said enclosure includes a second light source, wherein there are provided means to activate said second light source in response to detection of an intruder by said detector, and wherein said second lens includes a non-focusing lens portion for passing light emitted by said second light source.

3. An intrusion detector as specified in claim 1 or claim 2 wherein there is provided an opaque cover adapted for removable mounting to prevent light passage through said second aperture.

4. An intrusion detector as specified in claim 2 wherein there is provided an opaque cover for removable mounting to prevent light passage through said second aperture, and wherein said cover includes a knock-out portion, smaller than said second aperture and adjacent said second light source.

5. An intrusion detector as specified in claim 1 wherein said lens unit includes a notched slot, having a plurality of notches at spaced locations along said slot, and wherein said enclosure includes a projecting member for insertion into said slot and for engagement of said notches, whereby said lens unit can be mounted to said enclosure at a plurality of positions corresponding to said notches.

6. An intrusion detector as specified in claim 1 wherein said first light source is provided with a light shield having an aperture, said aperture having a size selected to limit said light beam to correspond to said region of space.

7. An infrared detector as specified in claim 1 wherein said detector is provided with a cylindrical tube shielding the detector element from transverse air currents.

8. In an infrared intrusion sensor having an enclosure, an infrared detector in said enclosure, an aperture on said enclosure for passing infrared radiation to said detector and a lens element arranged in said aperture, the improvement wherein said lens element includes a notched slot and said enclosure includes a projecting member for engaging said slot, said slot having a plurality of notches spaced at discrete positions along said slot for selectively engaging said projecting member thereby to mount said lens element to said enclosure at a plurality of discrete lens positions.

9. The improvement specified in claim 8 wherein said slot is asymmetrical on said lens element and said projecting member is located off center, whereby said lens element can be mounted to said enclosure in only a single orientation.

10. The improvement specified in claim 8 wherein said lens element is mounted to said enclosure by a mounting screw, and wherein said mounting screw passes through said slot.

11. The improvement specified in claim 8 wherein said projection is circular in cross-section and has a diameter larger than the width of said slot and wherein said notches comprise circular arcuate cut-outs in the side edges of said slot, said arcuate cut-outs having a diameter approximately equal to said projection diameter.

12. A wall mounted infrared intrusion sensor, comprising:

a substantially rectangular enclosure having a rear wall, two side walls, a top wall, a bottom wall and a front opening;

an infrared detector within said enclosure;

a lens unit for mounting over said front opening for focusing infrared radiation passing through said opening onto said detector;

a first printed circuit board, mounted to said rear wall substantially parallel thereto;

first and second slots arranged opposite each other in said side walls and extending parallel to said bottom wall in proximity thereto;

a second printed circuit board mounted in said slots parallel to said bottom wall;

circuit wires interconnecting said first and second printed circuit boards adjacent the intersection of said rear wall and said bottom wall; and means on said second printed circuit board, adjacent said aperture, for connecting said sensor to an alarm circuit.

13. An intrusion sensor as specified in claim 12 wherein said detector is mounted on said first printed circuit board.

14. An intrusion sensor as specified in claim 12 wherein said second printed circuit board is secured to said enclosure by a detent and locking unit.

15. An intrusion sensor as specified in claim 12 wherein there is provided an exterior channel on one of said side walls, said channel being generally parallel to said bottom wall and having an opening to the interior of said enclosure at an end thereof adjacent said front opening.

16. An intrusion detector for mounting within a wall, and arranged to resemble an electrical outlet, comprising:

an enclosure for insertion into said wall, said enclosure having a rear wall, first and second sidewalls, a top wall, a bottom wall and a front opening;

a cover plate, for mounting to said enclosure over said opening, said cover plate having first and second apertures formed therein;

a first printed circuit board, mounted parallel and adjacent to said rear wall in said enclosure, said first printed circuit board having mounted thereon an infrared detector, opposite said first aperture, and a first light source, opposite said second aperture;

a second printed ciricuit board, mounted parallel and adjacent to said bottom wall in said enclosure, said second board being connected to said first board by jumper wires, and said second board having mounted thereon an alarm indicator light, to be illuminated in response to detection of an object by said detector, and means for connecting said intrusion detector to an alarm system; and a lens unit, mounted between said enclosure and said cover plate, said lens unit having a first lens for focusing infrared radiation onto said detector unit, a second lens for focusing light from said first light source and an area for passing light from said alarm indicator light.

17. An intrusion detector as specified in claim 16 wherein said connecting means is arranged on said second printed circuit board near said front opening.

18. An intrusion detector as specified in claim 17 wherein said enclosure includes an opening for connecting wires in one of said sidewalls adjacent said connecting means.

19. An intrusion detector as specified in claim 16 wherein said connecting means includes a terminal for supplying current to said first light, and wherein there is provided a wire for selective connection to said terminal to thereby selectively activate said first light.

* * * * *